United States Patent
Giacalone et al.

(10) Patent No.: US 9,593,699 B2
(45) Date of Patent: Mar. 14, 2017

(54) FASTENER DEVICE FOR FASTENING A PANEL TO A STRUCTURE, AND AN AIRCRAFT

(71) Applicant: AIRBUS HELICOPTERS, Marignane (FR)

(72) Inventors: Jean-Michel Giacalone, Aix en Provence (FR); Clement Peyrusaubes, Aix en Provence (FR); Marc Denavaux, Nans-les-Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 51 days.

(21) Appl. No.: 14/704,238

(22) Filed: May 5, 2015

(65) Prior Publication Data

US 2015/0322980 A1    Nov. 12, 2015

(30) Foreign Application Priority Data

May 12, 2014    (FR) ...................................... 14 01060

(51) Int. Cl.
*B64C 1/06*    (2006.01)
*F16B 1/00*    (2006.01)
(Continued)

(52) U.S. Cl.
CPC ................ *F16B 1/00* (2013.01); *B64C 1/066* (2013.01); *F16B 5/065* (2013.01); *H01F 7/0252* (2013.01);
(Continued)

(58) Field of Classification Search
CPC . F16B 1/00; F16B 5/065; B64C 1/066; Y10T 292/11; E05C 17/56; E05C 19/16; E05C 19/163; E05C 19/166; E05C 19/168
(Continued)

(56) References Cited

U.S. PATENT DOCUMENTS 2,970,857 A    2/1961    Squire
4,585,197 A    4/1986    Liautaud et al.
(Continued)

FOREIGN PATENT DOCUMENTS

DE                145325 C    12/1902
DE        202004001958         6/2005
(Continued)

OTHER PUBLICATIONS

Chinese First Office Action Dated Aug. 2, 2016, Application No. 2015102389555, Applicant Airbus Helicopters, 5 Pages.
(Continued)

*Primary Examiner* — Timothy D Collins
*Assistant Examiner* — James Atwell
(74) *Attorney, Agent, or Firm* — Brooks Kushman P.C.

(57) ABSTRACT

A fastener device provided with at least one movable stud and a stationary stud, the movable stud including first magnetization means co-operating with second magnetization means of the stationary stud. One magnetization means is carried by a ball joint, each magnetization means being carried by movement means in order to move the first magnetization means in translation in a plane and to move the second magnetization means in translation along a longitudinal axis that is substantially orthogonal to the plane from an engagement position to a disengagement position in reversible manner, the magnetization means being strongly magnetically attracted to each other when they are facing and each in the engagement position and being magnetically attracted only slightly or not at all when at least one magnetization means is in the disengagement position.

20 Claims, 6 Drawing Sheets

(51) Int. Cl.
*F16B 5/06* (2006.01)
*H01F 7/02* (2006.01)

(52) U.S. Cl.
CPC ....... *F16B 2001/0035* (2013.01); *Y10T 24/30* (2015.01); *Y10T 24/303* (2015.01)

(58) Field of Classification Search
USPC ................ 244/131, 132; 24/303, 114.2, 457
See application file for complete search history.

(56) References Cited

U.S. PATENT DOCUMENTS

| | | |
|---|---|---|
| 5,280,991 A | 1/1994 | Weiland |
| 7,178,207 B2 | 2/2007 | Wong et al. |
| 2002/0197107 A1 | 12/2002 | Granata |
| 2008/0140330 A1 | 6/2008 | Morioka et al. |
| 2012/0025022 A1 | 2/2012 | Buchs et al. |

FOREIGN PATENT DOCUMENTS

| | | |
|---|---|---|
| GB | 1056797 | 1/1967 |
| WO | 2009108461 | 9/2009 |

OTHER PUBLICATIONS

French Search Report Dated Jan. 12, 2015, Application No. FR 1401059, Applicant Airbus Helicopters, 6 Pages.
French Search Report Dated Jan. 14, 2015, Application No. FR 1401060, Applicant Airbus Helicopters, 6 Pages.

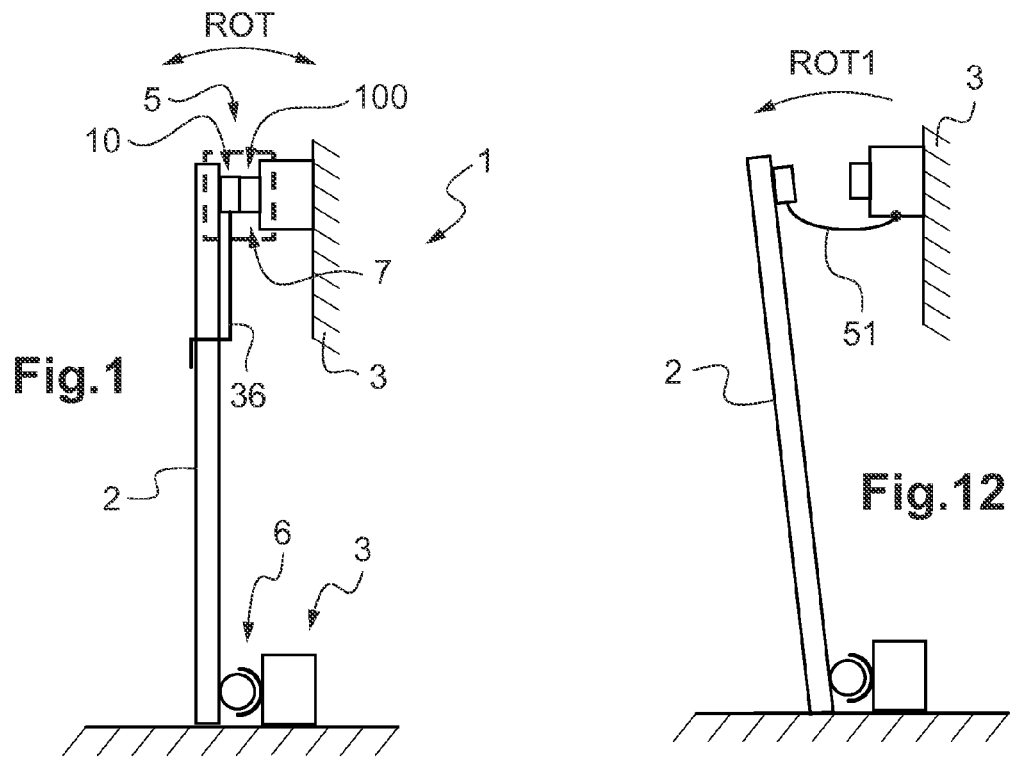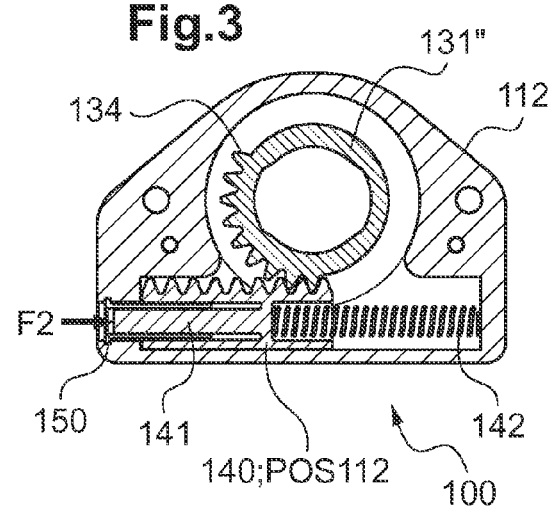

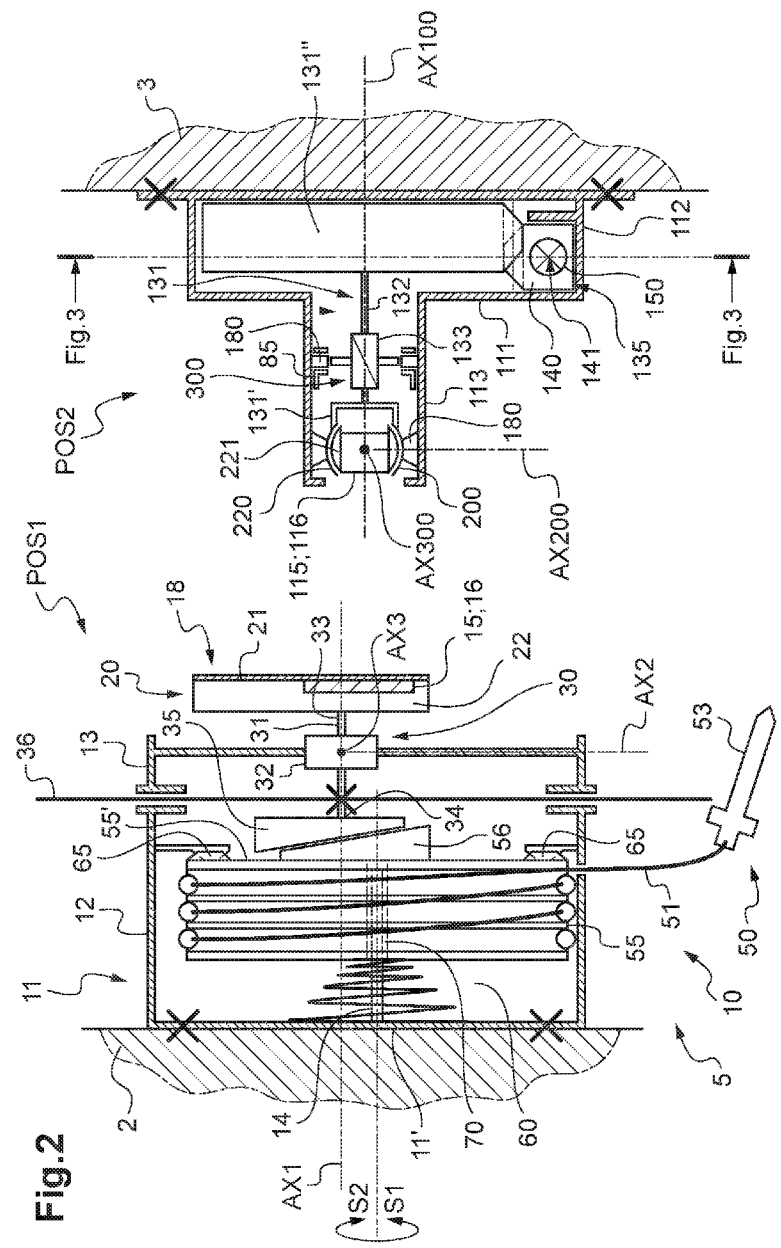

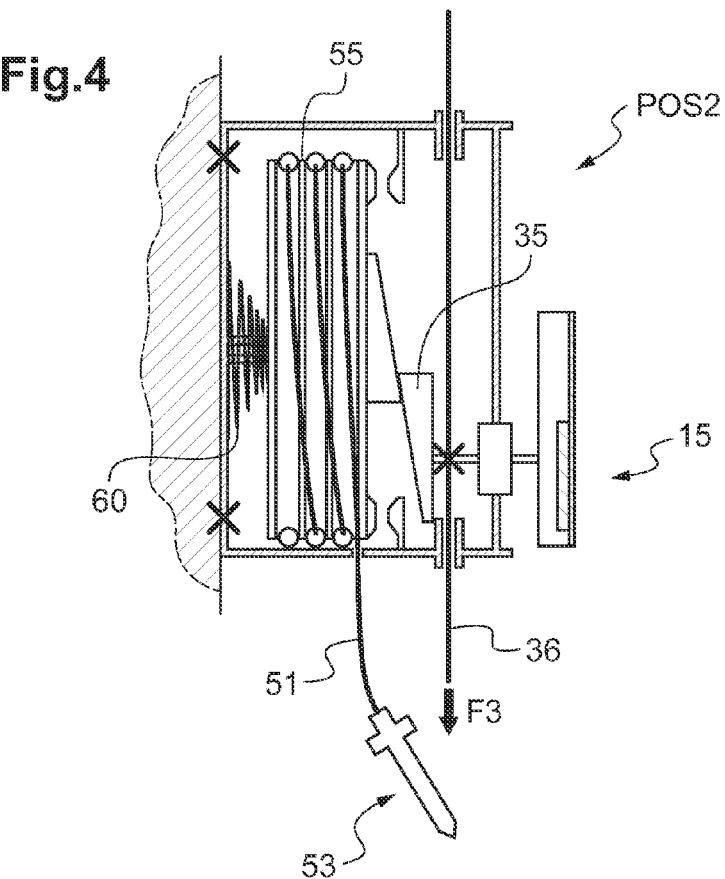
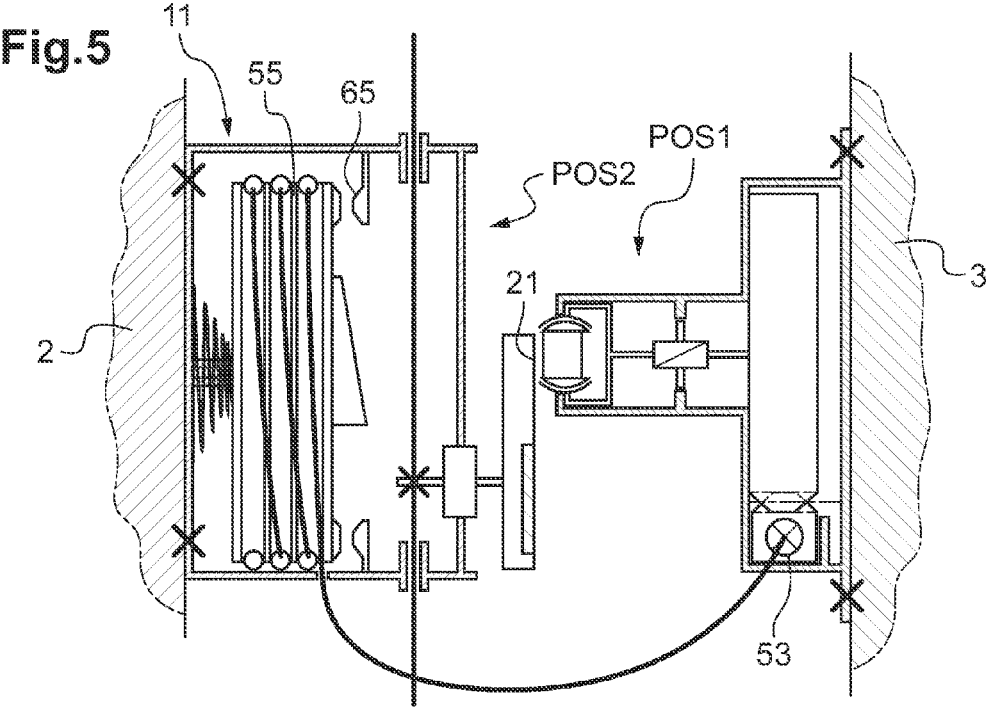

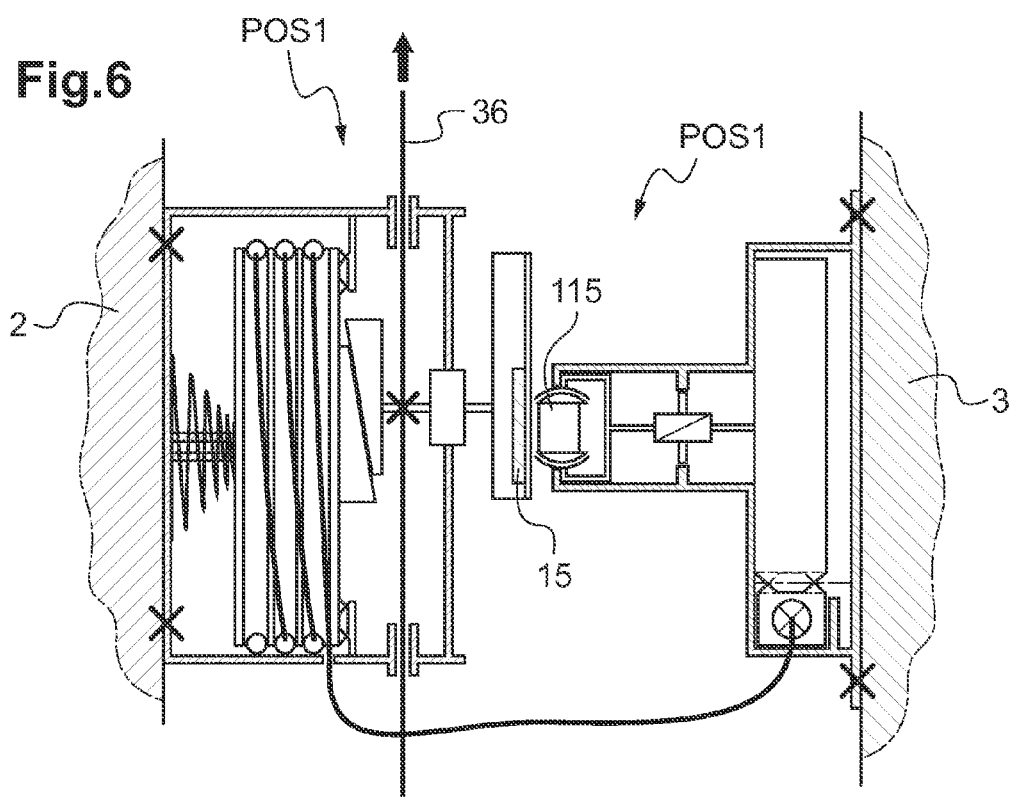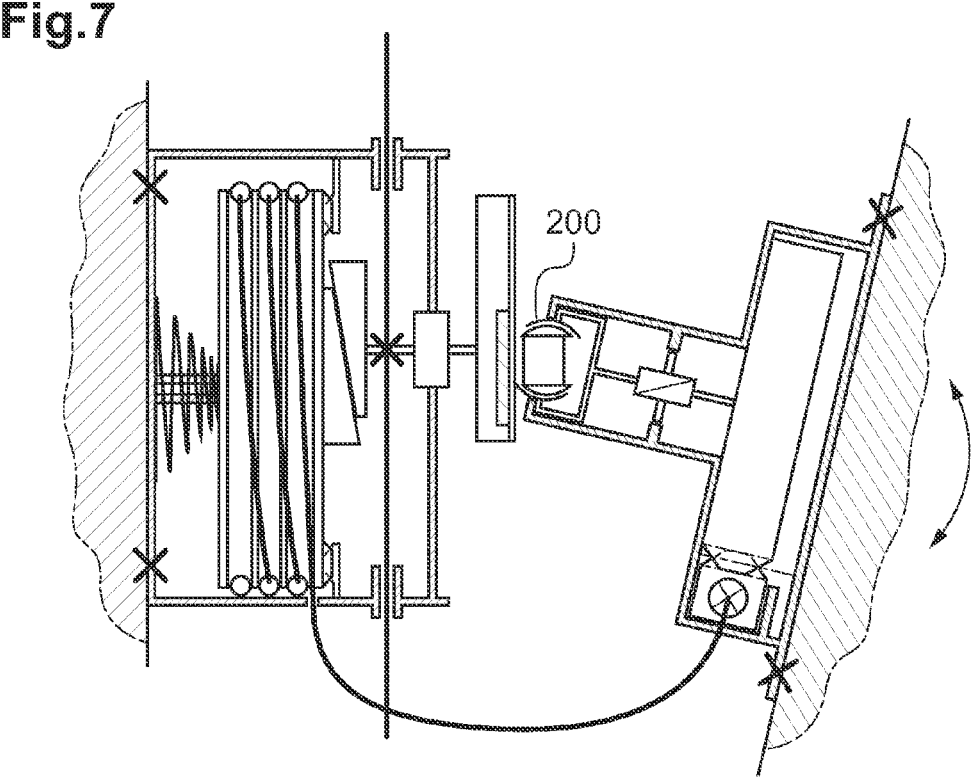

FASTENER DEVICE FOR FASTENING A PANEL TO A STRUCTURE, AND AN AIRCRAFT

CROSS REFERENCE TO RELATED APPLICATION

This application claims priority to French patent application No. FR 14 01060 filed on May 12, 2014, the disclosure of which is incorporated in its entirety by reference herein.

BACKGROUND OF THE INVENTION (1) Field of the Invention

The present invention relates both to a fastener device for fastening a panel and in particular a trim panel of a vehicle cabin, and also to an aircraft provided with the device.

(2) Description of Related Art

An aircraft usually includes panels covering the walls of a vehicle cabin. Under such circumstances, such panels are commonly referred to as "trim panels".

The panels are fastened to the structures defining the vehicle cabin by devices referred to for convenience as "fastener devices".

A known fastener device includes screw-fastener means. Each panel is then directly screw-fastened to a structure.

Such a screw-fastening fastener device has the advantage of being reliable and inexpensive.

However, that fastener device is by its very nature visible, and that can be detrimental to visual appearance in some aircraft.

In addition, that fastener device may involve tight mounting tolerances, and can therefore lead to difficulties of assembly.

Furthermore, an aircraft may be subjected to vibration. A screw-fastener device has low damping capacity against vibration.

Other fastener devices implement ball-lock pins or pegs and receptacles interposed between the panel and the structure.

Those fastener devices are thus less visible or even invisible, and their mounting tolerances are advantageous.

However, those fastener devices can be expensive, with little capacity for damping vibration.

In addition, an aircraft must comply with certification rules in terms of crashworthiness. Demonstrating that those fastener devices are crashworthy can turn out to be tricky.

Consequently, implementation of a fastener device for fastening a panel on an aircraft leads to specific difficulties in terms of vibration and of crashworthiness in particular. The invention is therefore particularly situated in this technical field.

Under such circumstances, a fastener device for fastening a panel of an aircraft may include at least one of the following advantages: being as invisible as possible; easy to assemble; lightweight; inexpensive; reliable; vibration-damping; and compatible with certification regulations in terms of crashworthiness.

Document US 2002/197107 describes a fastener device for fastening a decorative panel to a motor vehicle. That document therefore does not make reference to the problems specific to an aircraft.

The fastener device is provided with a base connected to a carrier plate. The carrier plate supports fastener means that may be magnetic.

Document WO 2009/108461 relates to a magnetic fastener provided with a support. An annular magnetic assembly carrying a magnet is then engaged about a stud of the support and a magnet.

The support is then fastened to a member for attaching said member to a metal plate via the magnet.

That device is advantageous. However, the arrangement of a trim panel against an aircraft structure may generate positioning constraints such as misalignment of the panel relative to the structure.

In addition, a magnet is likely to be damaged when the magnet comes into "violent" contact with another magnet or with a metal plate. Magnets have relatively little resistance to shock.

A magnet may also be tricky to make crashworthy.

Document U.S. Pat. No. 5,280,991 describes a magnetic fastener device for a vehicle roof panel. That fastener device includes magnets incorporated on a periphery of the panel.

Document U.S. Pat. No. 7,178,207 describes a magnetic fastener device having two magnets.

Documents GB 1 056 797 A and DE 20 2004 001958 U1 are also known.

BRIEF SUMMARY OF THE INVENTION

The present invention thus aims to provide a fastener device seeking to present at least one of the following advantages: being as invisible as possible; easy to assemble; lightweight; inexpensive; reliable; vibration-damping; and compatible with certification regulations in terms of crashworthiness.

The invention therefore seeks to provide a fastener device for fastening a panel to a structure, said fastener device being provided with at least one reversible fastener assembly including a movable stud suitable for being fastened to the panel and a stationary stud suitable for being fastened to the structure, the movable stud including first magnetization means co-operating with second magnetization means of the stationary stud, at least one of the magnetization means including a magnet.

For ease of reading, the term "first" is used to describe a member of the movable stud and the term "second" is used to describe the corresponding member of the stationary stud.

In addition, a magnetization means is carried by a ball-joint of the associated stud, each magnetization means being connected by movement means that move the magnetization means from an engagement position to a disengagement position in translation and in reversible manner, a movement means named "first movement means" of the movable stud moving the first magnetization means in translation in a plane and a movement means named "second movement means" of the stationary stud moving the second magnetization means in translation along a longitudinal axis of the stationary stud that is substantially orthogonal to said plane, the first and second magnetization means being strongly magnetically attracted to each other when they are facing and each in the engagement position, and being magnetically attracted only slightly or not at all when at least one magnetization means is in the disengagement position For example, the first magnetization means are fastened directly to the movement means of the movable stud, the second magnetization means being carried by a ball joint that is fastened to the movement means. Each magnetization means may possibly be carried by a ball joint.

In addition, the longitudinal axis of the movable stud, referred to as the "first longitudinal axis" is substantially parallel to the longitudinal axis of the stationary stud referred to as the "second longitudinal axis". The plane in which the first magnetization means move in translation is then substantially parallel to the panel fitted with the movable stud The term "substantially horizontal" is used to mean that the first longitudinal axis and the second longitudinal axis are on the same axis when the movable stud and the stationary stud are properly positioned and magnetically attracted to each other.

Under such circumstances, each magnetization means carried by a ball joint has three degrees of freedom to move in rotation relative to a casing of the associated stud as provided by said ball joint. These degrees of freedom make it possible to accommodate an offset between the movable stud and the stationary stud, e.g. an angular offset, a transverse offset, and/or an offset in elevation.

Consequently, the fastener device provides the assembly with advantageous tolerance. This characteristic makes it possible to be more flexible with the accuracy with which the panel is positioned relative to the structure that is to receive trim.

In addition, these degrees of freedom to move in rotation tend to reduce the risk of the device jamming, e.g. as a result of wedging, caused by deformation of the trim panel or of the structure that is to receive trim.

Furthermore, the movable stud may be put side by side against an inside face of the panel that faces a face of said structure. As a result, the fastener device is barely visible from inside a cabin.

In addition, the fastener device may be standardized so as to be used for fastening multiple separate panels. This standardization may facilitate the work of an engineering and design department carrying out an interior installation. In addition, standardization makes it possible to facilitate the making of interface planes between the panels and the structures that are to be provided with trim.

In addition, this fastener device is simple to implement and tends to limit deterioration of each magnet, e.g. a high-capacity neodynium magnet.

An operator can operate the movement devices in order to position the magnetization means in their disengagement positions.

In addition to its degrees of freedom to move in rotation, each magnetization means presents a degree of freedom to move in translation. More precisely, the first magnetization means present a degree of freedom to move in translation in a plane defined by an axis in elevation and by a transverse axis. Conversely, the second magnetization means present a degree of freedom to move in translation along a longitudinal axis.

In order to fasten the panel onto a structure, an operator may then cause the magnetization means of the movable stud to move in translation into the disengagement position.

Consequently, the operator positions the magnetization means of the stationary stud in the engagement position.

The operator then pushes the panel towards the structure, causing each movable stud to come substantially into contact with the corresponding stationary stud.

Since the first magnetization means of each movable stud are in the disengagement position, the magnetic attraction between the first magnetization means and the second magnetization means is weak or zero in view of the air-gap separating them. Indeed, the first magnetization means are separated from the second magnetization means firstly along a longitudinal direction under the effect of the second movement means of the stationary stud, and secondly along a transverse direction or a direction in elevation under the effect of the first movement means of the movable stud.

The operator then reduces said air-gap to its minimum by causing the first magnetization means of each movable stud to move into the engagement position. The first magnetization means are then strongly magnetically attracted to the second magnetization means in order to hold the panel in position.

The movement of the magnetization means has the noteworthy advantage of avoiding any "violent" shock between the magnetization means. In the event of a shock of this type, the magnetization means bang together and that can lead to chipping or shattering of the magnetization means and, for a magnet, to a reduction in its power of attraction.

The invention thus makes it possible to fasten a panel to a structure by using a magnetization technology that is relatively inexpensive, and that is reliable over time. This technology makes it possible to provide assembly that is invisible, reliable, and accommodating of poor alignment, providing magnetization means are arranged in a ball joint.

In order to remove a panel, the operator moves the first magnetization means of each movable stud into the disengagement position along a plane that is parallel to the panel. The force of attraction between the magnetization means of the movable stud and of the stationary stud in an assembly is then no longer sufficient to prevent an operator from moving the panel relative to the structure.

In addition, this fastener device may further include one or more of the following additional characteristics.

Thus, the fastener device may include at least one pivot joint suitable for being fastened to the panel and to the structure in order to allow the panel to move in rotation relative to the structure.

By way of example, each pivot joint is arranged in a bottom portion of a panel, whereas a movable stud is fastened in a top portion of the panel.

An operator fastens the panel to the pivot joint, and then pivots the panel in order to fasten it to the structure. This pivot joint makes it easier to position the panel relative to the structure.

Furthermore, either each of the magnetization means of a fastener assembly includes a respective magnet, or one magnetization means includes a magnet and the other magnetization means includes a metal plate.

The first magnetization means and the second magnetization means may thus both include magnets.

However, if the force of attraction is very high, only one of the magnetization means need to be provided with a magnet. By way of example, the first magnetization means may include a magnet, whereas the second magnetization means of a fastener assembly include a plate suitable for being magnetically attracted to said magnet.

In addition, since at least one of the magnetization means includes a face referred to as a "connection face" for being magnetically attracted to the other magnetization means, said connection face may optionally be covered by an antifriction member.

By way of example, a tab of Teflon® may be stuck on the connection face of magnetization means of the magnet type.

This characteristic is in particular advantageous in a medium that is subjected to vibration in order to prevent said vibration eroding the magnetization means and a nickel-plated protection layer thereon, if any.

In addition, the stationary stud may include movement means referred to as "second movement means" provided with an arm, said arm carrying the second magnetization means of said stationary stud and including a wormscrew engaged in a nut attache to a casing of the stationary stud, the second movement means being provided with drive means for driving said arm in rotation so as to cause said arm to move in translation.

Since the nut is secured to the casing of the stationary stud, turning the wormscrew thus causes the arm, the ball screw where applicable, and the second magnetization means of the stud to move longitudinally.

This system is relatively simple and potentially inexpensive.

Furthermore, the arm may extend longitudinally from an end carrying the second magnetization means, possibly via a ball screw, towards an end that is provided with a toothed base, the drive means including a rack that is movable transversely, a periphery of said base being toothed at least in part and including at least one tooth engaged with the rack.

Consequently, a movement in translation of the rack causes the toothed base to turn on the operating principle of a cam. This rotation then causes the wormscrew to move in translation and thus also causes the second magnetization means to move in translation along a longitudinal axis.

In addition, the first magnetization means of the movable stud are carried by a nonmagnetic cradle that is secured to the first movement means, said cradle being movable in translation along a direction in a plane.

The cradle may include a nonmagnetic plane section followed by a hollowed-out section accommodating the first magnetization means, the plane section facing the second magnetization means in the disengagement position, the first magnetization means facing the second magnetization means in the engagement position.

Moreover, the first movement means of the movable stud possibly include a longitudinal shaft carrying a guide that is perpendicular to the longitudinal shaft, said longitudinal shaft being secured to the cradle and to drive means that are suitable for driving the movement in translation of said cradle in said plane, the guide being mounted to slide on a casing of the movable stud.

The drive means of the movable stud may include a control cable. By way of example, the drive means of the movable stud may also be controlled by an electrical system.

The design of the movable studs makes it possible to use a single cable-operated control to activate a plurality of studs simultaneously. Thus, the fastener device may include a plurality of fastener assemblies, each including a movable stud and a stationary stud, the racks of a plurality of movable studs being connected to the same cable-operated control.

The linking obtained between the movable studs makes it possible to simplify control of the panel when a plurality of movable studs are used, and also makes it possible to reduce the weight of the control system.

In addition, the fastener device may include a crash-proofing system provided with a safety line that is wound around an automatically-locking winder of said movable stud, said safety line carrying a ball-lock pin that can be inserted manually and in reversible manner in a receptacle of said stationary stud. This receptacle may be secured to a casing of the stationary stud.

Each fastener assembly, or at least one of them, may include a crash-proofing system implementing a safety line extending between the movable stud and the stationary stud.

This architecture makes it possible to separate the function of holding the panel for operational loads as carried out using the magnetization means for withstanding low forces, from the function of holding the panel for crash loads as carried out using the crash-proofing system to withstand high forces.

In parallel with the magnetization means, a cord restraint system makes it possible to withstand the forces associated with a crash. The safety line represents a cord mounted on an automatically-locking winder that makes it possible to minimize the movement of the panel relative to the structure in the event of a crash.

Moreover, this safety line allows the panel to be held in a half-open position for maintenance activities.

This safety line is dimensioned to withstand forces that are relatively high compared with its own weight. This dimensioning is relatively simple to perform.

Indeed, the forces exerted on the fastener device at the time of a crash can tend to separate the first and second magnetization means of a fastener assembly. The panel then moves away from the carrier structure until it is in an open position that is reached when the safety line is under tension.

In a first embodiment, by way of example, the winder is movable in translation along a longitudinal axis of the movable stud that is orthogonal to said plane in which the first magnetization means move in translation, while being arranged around guide means for guiding a casing of the movable stud, the winder being pressed by a spring member against the first movement means so as to be constrained to move in translation with the magnetization means of the movable stud.

The winder may include a sloping plane that is pressed by the spring member against a sloping face of the first movement means, such that a movement in translation of the first movement means in a plane gives rise to movement in translation of said winder along a longitudinal axis that is perpendicular to said plane.

In addition, the casing may include at least one tooth that co-operates with the toothed face of the winder in order to prevent rotation of the winder in an unwinding direction of rotation that makes it possible to empty out said safety line, when the magnetization means are in the engagement position.

While the panel is being locked, the first magnetization means and the winder are in their engagement positions. The toothed face of the winder is then engaged on at least one tooth of the casing. This tooth then prevents rotation of the winder tending to unwind the safety line. The length of the safety line between the movable stud and the stationary stud is thus constant while in this engagement position.

In contrast, in the disengagement position, it is possible to unwind the safety line, since the winder is not constrained to rotate with the magnetization means. This characteristic enables maintenance actions to be performed.

Consequently, the winder is generally locked against rotation, except when a voluntary action causes the first magnetization means of the movable stud to move towards the center of the first casing of the movable stud. At the time of this voluntary action, the safety line can be unwound, in particular so as to be able to engage the ball-lock pin in the dedicated receptacle of the stationary stud. However, in the event of a crash, the winder is locked by the dog clutch teeth of the first casing in order to retain the panel, in the event of the magnetization means becoming separated.

In a second embodiment, the winder is fastened to the casing of the movable stud by a hinge providing the winder with a degree of freedom to move in rotation relative to the casing of the mobile stud. The winder is thus not movable in translation within the movable stud.

This winder comprises a toothed ring, the first movement means of the movable stud including a tooth blocking the toothed ring in order to prevent the winder from moving in rotation when the magnetization means are in their engagement position. This tooth then prevents rotation of the winder tending to unwind the safety line.

Conversely, in the disengagement position, the winder is no longer engaged on the first movement means, which makes it possible to handle the safety line.

A resilient member may be interposed between the first movement means and the casing of the stationary stud in order to tend to position the tooth of the first movement means against the toothed ring.

Furthermore, said receptacle may have passing therethrough a pin of a rack that is engaged on the second means for moving the stationary stud in the absence of the ball-lock pin, said magnetization means of the stationary stud being in the disengaged position in the absence of the ball-lock pin.

This characteristic obliges an operator to fasten the ball-lock pin of a movable stud to a stationary stud in order to be able to secure the movable stud to the stationary stud. The safety of the fastener device is thus optimized.

In addition, the winder may include a return spring tending to generate rotation of the winder in a winding direction of rotation in order to wind said safety line around the winder.

While the panel is being closed, the safety line is automatically rewound by means of the return spring of the winder.

Before fastening the panel to a structure, the second magnetization means are set back within the stationary stud, namely in the disengagement position. Likewise, the first magnetization means are offset transversely or in elevation relative to the second magnetization means, namely in the disengagement position.

The operator then positions the panel relative to the structure, e.g. by making it pivot by means of a pivot joint.

The operator then inserts the ball-lock pin into the receptacle of the stationary stud. This insertion causes the second rack to move and consequently causes the second magnetization means to move in translation towards the outside of the stationary stud and therefore towards the movable stud.

This operation is possible because the winder is then no longer engaged with teeth of the casing of the movable stud or of the movement means of said movable stud, depending on the embodiment. Consequently, the operator can pull on the safety line in order to unwind it and plug the ball-lock pin into the stationary stud.

The operator then moves the panel to bring the movable stud closer to the stationary stud. Since the first magnetization means are offset transversally or in elevation, the first magnetization means do not come into contact with the second magnetization means, and that can avoid banging of the magnet(s).

The operator then moves the first magnetization means by bringing them closer to the second magnetization means.

This transverse movement or movement in elevation in a plane also causes the winder to be blocked, following a movement of the winder towards the teeth of the first casing or a movement of a tooth placed on the first movement means towards and against a toothed ring of the winder.

When the first magnetization means reach the engagement position, the first magnetization means are strongly magnetically attracted to the second magnetization means. In addition, the winder is prevented from moving by at least one tooth of the movable stud.

In order to remove the panel, the operator can perform the above-described steps in reverse order.

In addition, the fastener device may include an elastomer member, e.g. being interposed between the magnetization means of a stud and a casing of said stud, or else indirectly by being interposed between the movement means and said casing.

Each stud under consideration includes vibration-damper means, namely the elastomer member that uncouples the ball joint from the casing.

Possibly, a threaded knob is used to prestress the elastomer so as to modify its stiffness in order to match it to the system under consideration. This knob makes it possible to adjust the damping of the damper means after flight tests, without having to change the definition of the system.

In addition to a fastener device, the invention seeks to provide an aircraft provided with a structure and with at least one trim panel. The aircraft thus includes at least one fastener device of the invention.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which:

FIG. 1 is a section view of an aircraft provided with a panel fastened to a structure via a fastener device of the invention;

FIG. 2 is a diagrammatic view of a fastener assembly provided with a movable stud in a first embodiment;

FIG. 3 is a section view of a stationary stud showing its second rack;

FIG. 4 shows a movable stud in a first embodiment in a disengaged position obtained by moving the first rack with a cable-operated control;

FIGS. 5 to 8 are views explaining how a movable stud is secured to a stationary stud;

FIG. 9 and FIG. 12 are views explaining operation in the event of a crash, in particular of a fastener device provided with a crash-proofing system.

Figure 8:
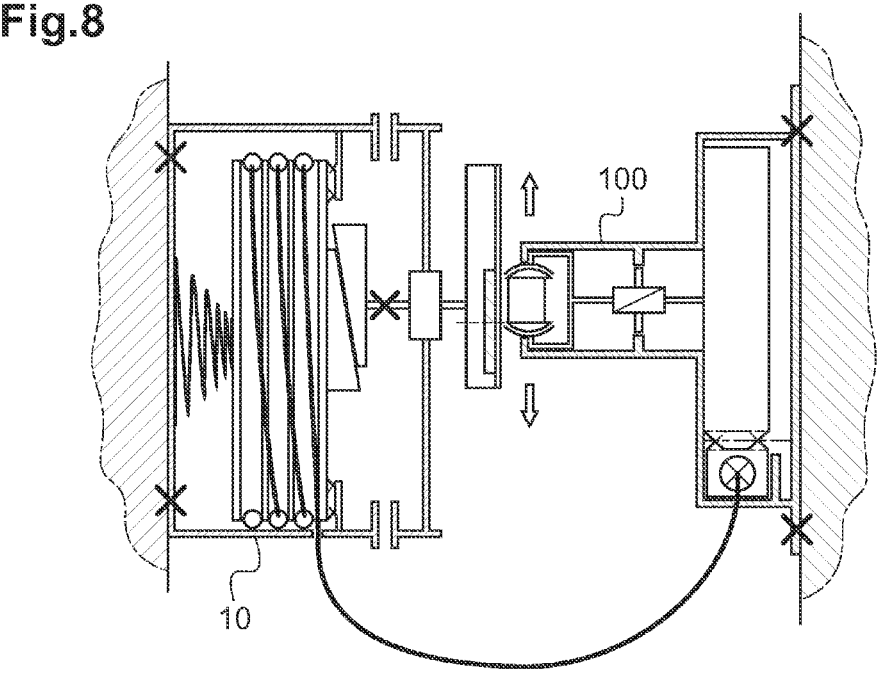

Elements that are present in more than one of the figures are given the same references in each of them.

DETAILED DESCRIPTION OF THE SEVERAL VIEWS OF THE DRAWINGS

FIG. 1 shows an aircraft 1 including at least one panel 2 for fastening to a structure 3. By way of example, a trim panel 2 is to be fixed to a structure defining a cabin, at least in part.

Under such circumstances, the aircraft 1 is provided with a fastener device 5.

This fastener device 5 includes at least one fastener assembly 7 for fastening a panel 2 in reversible manner to the structure 3. Such a fastener assembly 7 thus includes both a movable stud 10 that is fastened to the panel 2, and also a stationary stud 100 that is fastened to the structure 3 using conventional means.

In addition, the fastener device 5 shown also includes at least one pivot joint 6. This pivot joint 6 includes a portion fastened to the structure 3 and a portion fastened to the panel 2 in order to allow a movement in rotation ROT of the panel 2 relative to the structure 3.

For example, at least one fastener assembly is located in a top section of the panel, whereas at least one pivot joint is situated at the foot of the panel 2.

In a variant, the fastener device includes a plurality of fastener assemblies but does not have a pivot joint.

With reference to FIG. 2, each stud includes magnetization means 15, 115 in order to adhere to each other in reversible manner. More precisely, at least one magnetization means includes a magnet 16, the other magnetization means of a fastener assembly 7 including either another magnet or a metal plate that is sensitive to a magnetic field.

Moreover, each magnetization means presents a connection face for being magnetically attracted to the other magnetization means. Under such circumstances, at least one connection face can be covered with a conventional antifriction member 18.

For example, the magnetization means referred to as "first magnetization means 15" of the movable stud is a magnet 16 covered with an antifriction member 18. The magnetization means referred to as "second magnetization means 115" of the stationary stud then comprise for example a metal plate 116.

In addition, each stud 10, 100 includes a casing. This casing can be considered as comprising a rear portion 12, 112 fastened either to the panel or to the carrier structure 3, and a front portion 13, 113 facing the other front portion.

Consequently, the movable stud has a first casing 11 provided with a first rear portion 12 fastened to the panel 2 and a first front portion 13. The stationary stud has a second casing 111 provided with a second rear portion 112 fastened to the structure 3 and a second front portion 113 facing the first front portion 13.

At least one stud further includes a ball joint 200 arranged in the front portion of the stud. Said ball joint carries the associated magnetization means 115 in order to allow it three degrees of freedom of movement in rotation about a longitudinal axis AX100 of the stud passing through the panel and the structure, and also about a transverse axis AX300, and an elevation axis AX200 that is substantially parallel to the panel and to the structure.

The longitudinal axes AX1, AX100 of the movable and stationary studs 15, 115 of a fastener assembly are parallel in the absence of excessive offset. However, such absence of offset is a theoretical ideal. As explained below, the invention makes it possible to accommodate such an offset. These longitudinal axes are also perpendicular to the panel 2 and the structure 3.

Consequently, the second magnetization means 115 of the stationary stud are advantageously carried by a ball joint 200.

In addition, each stud includes movement means carrying magnetization means of the stud in order to confer a degree of freedom of movement in translation to the magnetization means of the stud. More precisely, each magnetization means can be moved in translation relative to the casing of the corresponding stud from an engagement position towards a disengagement position.

The magnetization means 15, 115 of the movable stud and of the stationary stud are strongly attracted magnetically to each other when they are facing and each of them is in the engagement position POS1, and they are magnetically attracted only slightly or not at all when at least one magnetization means 15, 115 is in the disengagement position POS2. In the engagement position, one of the magnetization means projects longitudinally from the casing of the associated stud.

The movement means referred to as "first movement means 30" of the movable stud are advantageously secured to a nonmagnetic cradle 20.

The cradle 20 thus carries the first magnetization means 15. To this end, the cradle 20 may comprise successively along its direction of movement in translation, firstly a nonmagnetic plane section 21 and then a hollowed-out section 22. The first magnetization means 15 are then housed in the hollowed-out section 22.

This shape makes it possible to place the first magnetization means 15 facing the second magnetization means 115 when the first magnetization means are in their engagement position POS1, as shown in FIG. 2. However, the plane section 21 faces the second magnetization means 115 in the disengagement position POS2.

Consequently, the first movement means 30 move the cradle 20 in a direction that lies in a plane that is parallel to the panel 2. Said direction may either be a direction in elevation, as in the embodiment of FIG. 2, or else it may be a transverse direction.

To this end, the first movement means 30 include a longitudinal shaft 31. Said longitudinal shaft 31 extends longitudinally from a first end 33 that is secured to the cradle 20 towards a second end 34. The longitudinal shaft 31 then carries a guide 32 between its first end 33 and its second end 34. Consequently, the longitudinal shaft may comprise two segments, each segment being secured to said guide 32.

The guide 32 extends perpendicularly to the longitudinal shaft, namely along a direction in elevation as shown in FIG. 2. Furthermore, this guide 32 is a hollow guide sliding on a stem of the front portion 13 of the first casing 11.

Furthermore, said longitudinal shaft 31 is secured to drive means that are suitable for driving the movement in translation of the guide along said stem. Such drive means of the movable stud may include a control cable 36.

The movement means referred to as second movement means 300 of the stationary stud may include an arm 131 bearing the ball joint 200 of the stationary stud. By way of example, the arm carries an outer cage 220 of the ball joint in which a truncated ball 221 carrying the second magnetization means 115 is free to move in rotation.

This arm 131 comprises a wormscrew 132 engaged with a nut 133 and attached directly or indirectly to the second casing of the stationary stud 100.

In addition, the second movement means 300 are provided with drive means referred to as second drive means 135 in order to rotate the arm 131 in order to generate its movement in translation.

By way of example, the arm 131 extends longitudinally from a distal end 131' carrying a ball joint 200 towards a proximal end 131" that is provided with a toothed base 131"'. The second drive means 135 then comprise a transversely movable rack 140 that is engaged with a tooth 134 on a periphery of the base 131" of the second movement means.

With reference to FIG. 3, a spring 142 may be arranged between the second casing and the second rack 140. This spring 142 tends to position the second rack 140 in a second position POS112 as shown in FIG. 3, which leads to the second magnetization means being positioned in the disengagement position of FIG. 1.

In opposition to this spring 142, the second rack 140 is moved along arrow F2 towards a first position giving rise to the second magnetization means being positioned in the engagement position.

In addition, and with reference to FIG. 2, the fastener assembly may include a crash-proofing system 50.

This crash-proofing system 50 comprises a safety line 51 that is wound up around a winder 55, e.g. an automatically-locking winder, of the movable stud 10. The safety line thus extends from a segment fastened to the winder towards a segment carrying a ball-lock pin 53.

This ball-lock pin is insertable manually and in reversible manner in a receptacle 150 that is secured to the second casing 111 of the stationary stud 100.

More precisely, in the absence of the ball-lock pin 53, a pin 141 of the second rack 140 of the stationary stud 100 passes through the receptacle 150. The second magnetization means 115 of the stationary stud 100 are then in the disengagement position POS2. FIG. 3 shows such an arrangement of the pin 141 in the receptacle 150.

However, when the ball-lock pin 53 is housed in the receptacle 150, said ball-lock pin 53 pushes the second rack along arrow F2. The second magnetization means 115 of the stationary stud 100 are then moved into the engagement position.

Consequently, the ball-lock pin represents drive means suitable for moving the second rack.

In a first embodiment and with reference to FIG. 2, the winder 55 is movable in translation along a first longitudinal axis AX1 of the movable stud 10. To this end, and by way of example, the winder 55 is arranged around guide means 14 for guiding the first casing 11. The winder is then movable both in translation and also in rotation about the first longitudinal axis AX1 in the first rear portion 12 of the first casing 11.

This winder 55 may be pressed against the first movement means 30 by a spring member 60. The spring member 60 may be a stationary conical spring fastened to an end wall 11' of the first casing that is secured to the panel 2.

Consequently, the winder 55 may include a sloping plane 56. Furthermore, the first movement means may include a sloping face 35 carried by the second end 34 of the longitudinal shaft.

Under such circumstances, the sloping plane 56 may be pressed by the spring member 60 against the sloping face 35 of the first movement means 30. A movement in translation of the first movement means 30 along a stem of the first face thus generates a movement in translation of the winder 55.

Moreover, the first casing 11 may include at least one tooth 65 engaged with a toothed face 55' of the winder 55 in the engagement position POS1. In this position, each tooth 65 of the casing prevents the winder 55 from turning in an unwinding direction of rotation 51 that would enable the safety line 51 to be unwound from the winder.

However, the movement in translation of the winder towards the disengaged position moves the toothed face 55' away from the teeth of the first casing. Thus, the toothed face of the winder is the face of the winder that faces the first magnetization means.

Figure 10:
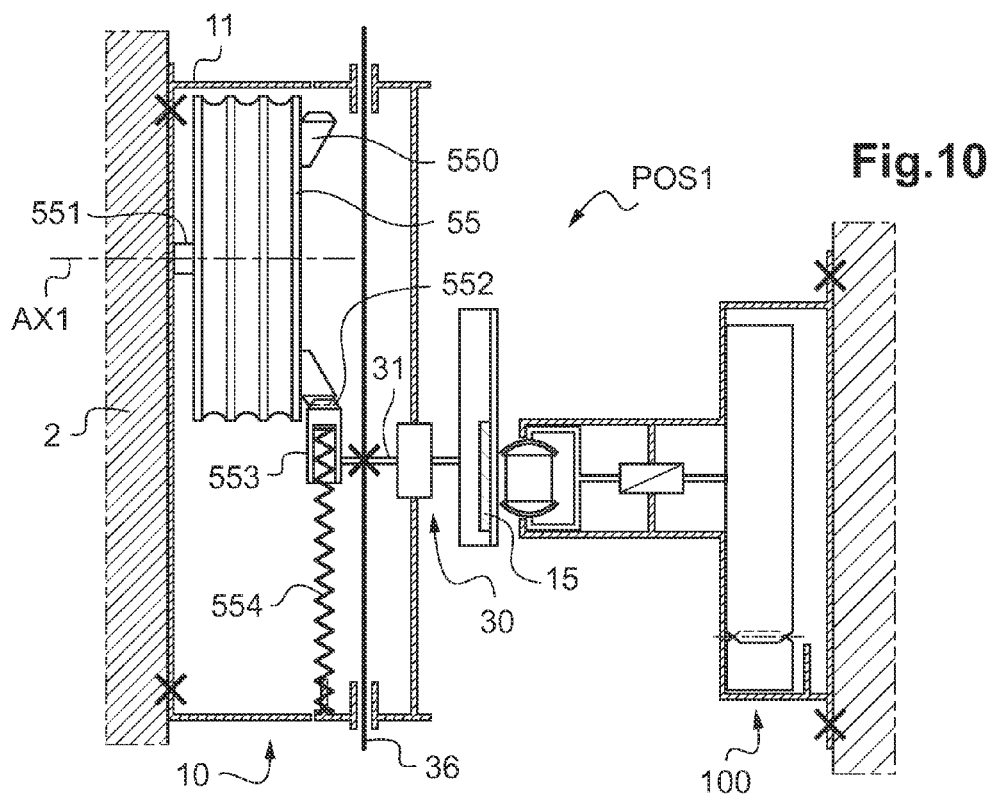
FIGS. 10 and 11 are diagrams showing a second embodiment of the movable stud.

FIG. 10 shows a second embodiment.

The winder 55 is fastened to the first casing 11 of the movable stud 10 by a hinge 551 conferring, to this winder only, a degree of freedom to move in rotation relative to the first casing 11. The winder is then movable in rotation about the first longitudinal axis AX1 in the first rear portion 12 of the first casing 11.

By way of example, the winder is arranged on a stem 551 of the movable stud. The stem is substantially orthogonal to the panel 2.

In addition, the winder 55 comprises a toothed ring 550.

Under such circumstances, the first movement means 30 of the movable stud includes a tooth 552. This tooth 552 is pressed against the toothed ring 550 in order to prevent the winder from turning in rotation when the magnetization means are in their engagement position POS1.

By way of example, said tooth 552 is provided on a support 553 that is secured to the longitudinal shaft 31.

Furthermore, a resilient member 554 may be interposed between the first movement means 30 and the first casing. By way of example, the resilient member includes a spring housed partially inside the support 553.

Figure 11:
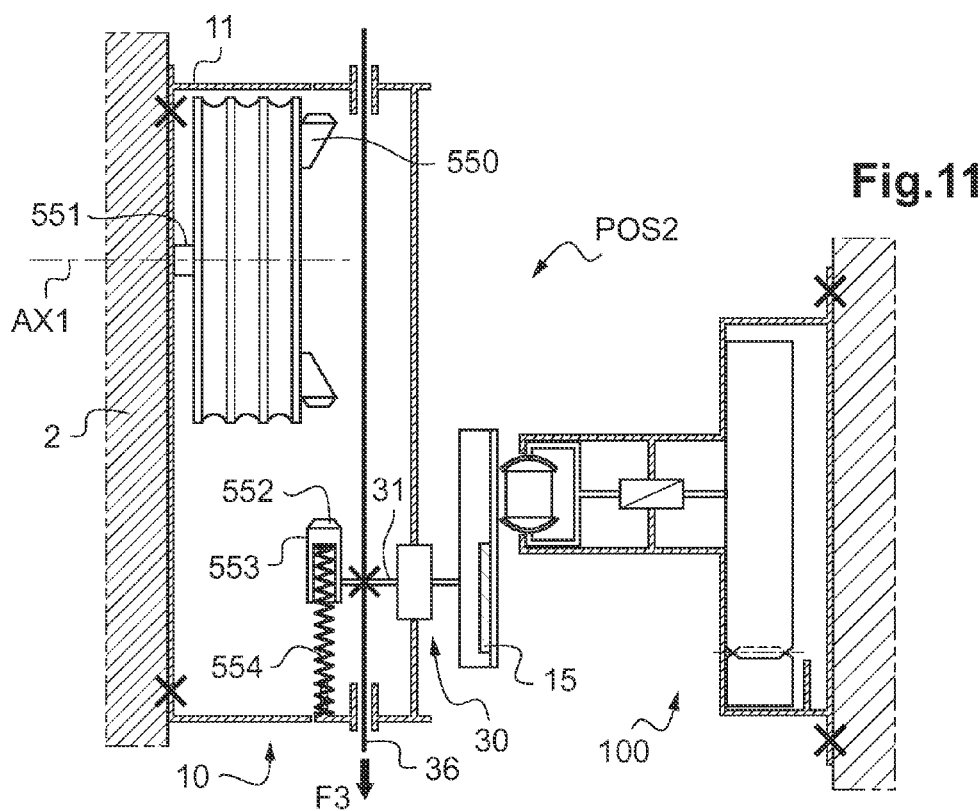

With reference to FIG. 11, when an operator operates the cable 36, the operator causes the first movement means to move in translation along arrow F3 by compressing the resilient member 554.

The winder, the longitudinal shaft, and the first magnetization means 15 are each positioned in the disengagement position POS2.

In this disengagement position POS2, the winder is free to move in rotation.

Regardless of the embodiment, and with reference to FIG. 2, the winder 55 may possibly include a return spring 70 tending to generate movement of the winder in a winding direction of rotation S2 in order to wind the safety line 51 around the winder 55.

In addition, the fastener device 5 shown diagrammatically includes at least one elastomer member 180 interposed directly or indirectly between the second magnetization means 115 and a casing 111 of said stationary stud 100.

By way of example, the stationary stud includes a first elastomer member that is indirectly interposed between the second ball joint 200 and the second casing 111, while being arranged between the nut and the second casing. A threaded washer 85 enables the elastomer member to be pre-stressed.

The second casing of the stationary stud gives access to the washer 85. For example, the front portion 113 of the second casing is shortened, with the washer projecting from said front portion in order to be handled by an operator.

In alternative or additional manner, the stationary stud may include a second elastomer member 180 that is interposed directly between the second ball joint 200 and the second casing 11. However, this second elastomer member 180 is not secured to the second ball joint 200 in order to enable this second ball joint to slide.

This arrangement is not limiting.

FIGS. 2 and 4 to 9 explain the operation of the first embodiment of the fastener device. Nevertheless, the second embodiment of the fastener device operates in a similar manner.

With reference to FIG. 2, before the movable stud 10 is connected to the stationary stud 100, the movable stud is in its engagement position POS1.

In contrast, the stationary stud is in the disengagement position POS2. The second arm, the second ball joint, and the second magnetization means are each positioned as close as possible to the structure 3.

An operator then moves the movable members of the movable stud towards their disengagement position.

In FIG. 4, the operator operates the cable 36, and that causes the first movement means to move in translation along arrow F3.

The sloping face 35 of the first movement means exerts force on the winder 55, enabling said winder to move longitudinally by compressing the spring member 60.

The winder, the longitudinal shaft, and the first magnetization means 15 are each positioned in the disengagement position POS2.

In the same way, the movable members of the stationary stud are in the disengagement position.

Under such circumstances, and with reference to FIG. 5, the operator pushes the panel 2 to bring it closer to the structure 3.

The operator then takes hold of the ball-lock pin 53 in order to insert it in the receptacle of the stationary stud. Since the winder 55 is not locked by the teeth 65 of the first casing, said operator can indeed unwind the safety line in order to operate the ball-lock pin.

The insertion of the ball-lock pin into the receptacle causes the second arm, the second ball joint, and the second magnetization means to move towards their engagement positions POST shown in FIG. 5.

Conversely, the first magnetization means remain in their disengagement positions POS2. Consequently, the second magnetization means face the plane section 21 of the cradle 20.

By releasing the safety line, the operator enables the spring member to rotate the winder in order to rewind the safety line. The movable stud then presses against the stationary stud.

With reference to FIG. 6, the operator subsequently or simultaneously uses drive means of the movable stud in order to press the first magnetization means 15 against the second magnetization means 115 of the stationary stud.

The movable stud is then magnetically attracted to the stationary stud and that makes it possible to fasten the panel 2 to the structure 3.

It should be noted that if the ball-lock pin is not inserted in the stationary stud, this magnetic attraction is not possible. Indeed, in the absence of the ball-lock pin, the movable members of the stationary stud are in the disengagement position. This characteristic is advantageous from a safety point of view.

With reference to FIG. 7, having the magnetization means arranged on a ball joint 200 makes it possible to accommodate an angular offset between the panel 2 and the structure 3.

In the same way, and with reference to FIG. 8, this arrangement makes it possible to accommodate an axial offset between the panel 2 and the structure 3.

In the event of a crash, by way of example and with reference to FIG. 12, the magnetizing power of the magnetization means of the movable and stationary studs and thus the magnetic attraction between them can prove to be insufficient for holding the panel against the structure 3.

This panel then pivots relative to the structure 3. However, since the winder of the movable stud is blocked by the first casing, this rotary movement is stopped by the safety line 51.

Figure 9:
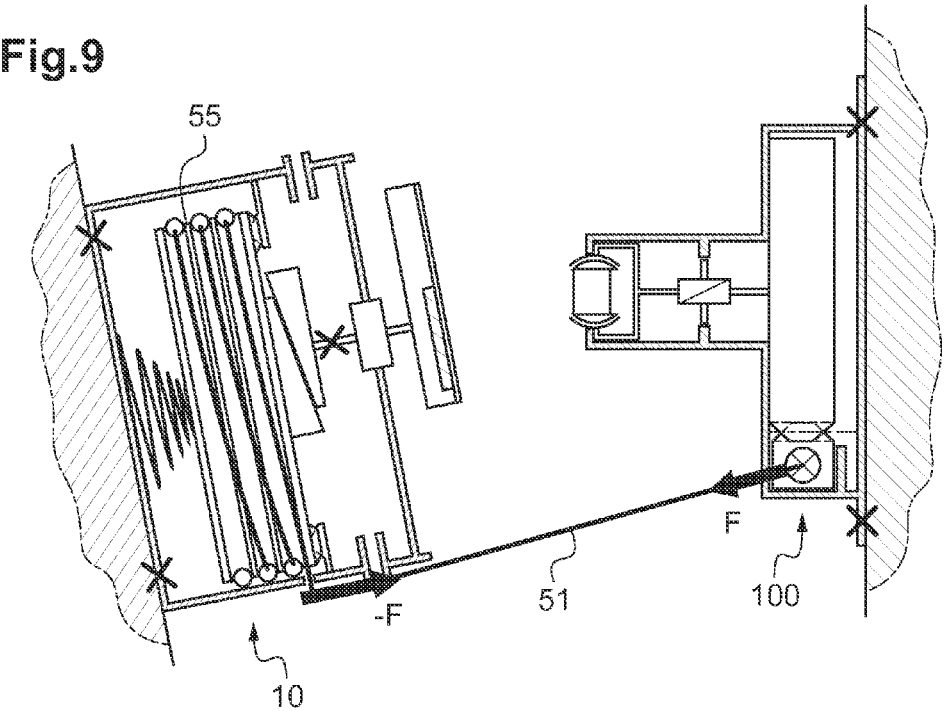

With reference to FIG. 9, the interface forces F exerted on the fastener device can be calculated analytically, since their directions and their values are known.

That makes it easier to use calculation to demonstrate that the fastener is appropriately crashworthy.

Naturally, the present invention may be subjected to numerous variants as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A fastener device for fastening a panel to a structure, the fastener device being provided with at least one fastener assembly including a movable stud suitable for being fastened to the panel and a stationary stud suitable for being fastened to the structure, the movable stud including first magnetization means co-operating with second magnetization means of the stationary stud, at least one of the first and second magnetization means including a magnet, wherein one magnetization means is carried by a ball joint of the associated stud, each magnetization means being connected to movement means that move the magnetization means from an engagement position to a disengagement position in translation and in reversible manner, the movement means comprises a first movement means of the movable stud moving the first magnetization means in translation in a plane, and a second movement means of the stationary stud moving the second magnetization means in translation along a longitudinal axis of the stationary stud that is substantially orthogonal to the plane, the first and second magnetization means being strongly magnetically attracted to each other when they are facing and each is in the engagement position, and being magnetically attracted only slightly or not at all when at least one magnetization means is in the disengagement position.

2. A fastener device according to claim 1, wherein the fastener device includes at least one pivot joint suitable for being fastened to the panel and to the structure in order to allow the panel to move in rotation relative to the structure.

3. A fastener device according to claim 1, wherein either each of the magnetization means includes a respective magnet, or one of the magnetization means includes a magnet and the other magnetization means includes a metal plate.

4. A fastener device according to claim 1, wherein at least one of the magnetization means includes a face referred to as a "connection face" for being magnetically attracted to the other magnetization means, the connection face is covered by an antifriction member.

5. A fastener device according to claim 1, wherein the second movement means are provided with an arm, the arm carrying the second magnetization means of the stationary stud and including a wormscrew engaged in a nut attached to a casing of the stationary stud, the second movement means being provided with drive means for driving the arm in rotation so as to cause the arm to move in translation.

6. A fastener device according to claim 5, wherein the arm extends longitudinally from an end carrying the second magnetization means towards an end that is provided with a toothed base, the drive means including a rack that is movable transversely, a periphery of the toothed base being toothed at least in part and including at least one tooth engaged with the rack.

7. A fastener device according to claim 1, wherein the first magnetization means of the movable stud are carried by a nonmagnetic cradle that is secured to the first movement means, the cradle being movable in translation along a direction in a plane.

8. A fastener device according to claim 7, wherein the cradle may include a nonmagnetic plane section followed by a hollowed-out section accommodating the first magnetization means, the plane section facing the second magnetization means in the disengagement position, the first magnetization means facing the second magnetization means in the engagement position.

9. A fastener device according to claim 7, wherein the first movement means of the movable stud include a longitudinal shaft carrying a guide that is perpendicular to the longitudinal shaft, the longitudinal shaft being secured to the cradle and to drive means that are suitable for driving the movement in translation of the cradle, the guide being mounted to slide on a casing of the movable stud.

10. A fastener device according to claim 9, wherein the drive means of the movable stud include a control cable.

11. A fastener device according to claim 1, wherein the fastener device includes a crash-proofing system provided with a safety line that is wound around an automatically-locking winder of the movable stud, the safety line carrying a ball-lock pin.

12. A fastener device according to claim 11, wherein the winder is movable in translation along a longitudinal axis of the movable stud by being arranged around guide means for guiding a casing of the movable stud, the winder being pressed by means of a spring member against the first movement means.

13. A fastener device according to claim 11, wherein the winder includes a sloping plane pressed by the spring member against a sloping face of the first movement means, such that a movement in translation of the first movement means in a plane gives rise to movement in translation of the winder along a longitudinal axis that is perpendicular to the plane.

14. A fastener device according to claim 12, wherein the casing includes at least one tooth that co-operates with a toothed face of the winder in order to prevent rotation of the winder in an unwinding direction of rotation that makes it possible to empty out the safety line, when the magnetization means are in the engagement position.

15. A fastener device according to claim 11, wherein the winder is fastened to the casing of the movable stud by a hinge providing the winder with a degree of freedom to move in rotation relative to the casing of the mobile stud, the winder comprising a toothed ring, the first movement means of the movable stud including a tooth blocking the toothed ring in order to prevent the winder from moving in rotation when the magnetization means are in the engagement position.

16. A fastener device according to claim 15, wherein the fastener device includes a resilient member interposed between the first movement means and the casing of the stationary stud in order to tend to position the tooth against the toothed ring.

17. A fastener device according to claim 11, wherein the stationary stud includes a receptacle having a pin of a rack passing therethrough the rack engaged on the second means for moving the stationary stud in the absence of the ball-lock pin, the magnetization means of the stationary stud being in the disengaged position in the absence of the ball-lock pin.

18. A fastener device according to claim 11, wherein the winder includes a return spring tending to generate rotation of the winder in a winding direction of rotation in order to wind the safety line around the winder.

19. A fastener device according to claim 1, wherein the fastener device includes an elastomer member interposed between magnetization means of the stud and a casing of the stud, either between the ball joint and the casing or else indirectly by being interposed between the movement means and the casing.

20. An aircraft provided with a structure and with at least one trim panel, wherein the aircraft includes at least one fastener device according to claim 1.

* * * * *